(12) United States Patent
Yamasaki

(10) Patent No.: US 10,701,234 B2
(45) Date of Patent: Jun. 30, 2020

(54) ILLUMINATION DEVICE HAVING A SUPPORT MEMBER FOR SUPPORTING A LIGHT GUIDE MEMBER AND IMAGE READING DEVICE INCLUDING THE SAME

(71) Applicant: KYOCERA Document Solutions Inc., Osaka (JP)

(72) Inventor: Shunsuke Yamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/130,361

(22) Filed: Sep. 13, 2018

(65) Prior Publication Data

US 2019/0082072 A1    Mar. 14, 2019

(30) Foreign Application Priority Data

Sep. 14, 2017   (JP) ................. 2017-176990

(51) Int. Cl.
*H04N 1/028* (2006.01)
*F21V 8/00* (2006.01)

(52) U.S. Cl.
CPC ....... *H04N 1/02855* (2013.01); *G02B 6/0031* (2013.01); *G02B 6/001* (2013.01)

(58) Field of Classification Search
CPC ................................................ H04N 1/02855
USPC ........................................................ 358/475
See application file for complete search history.

(56) References Cited

U.S. PATENT DOCUMENTS

| 6,015,200 | A | * | 1/2000 | Ogura | .................... | H04N 1/031 |
| | | | | | | 250/208.1 |
| 9,930,204 | B2 | * | 3/2018 | Takahashi | ............ | H04N 1/0289 |
| 2011/0013213 | A1 | * | 1/2011 | Takahashi | .............. | G03G 15/60 |
| | | | | | | 358/1.13 |
| 2012/0133994 | A1 | * | 5/2012 | Yamasaki | ........ | G03G 15/04036 |
| | | | | | | 358/296 |
| 2012/0250111 | A1 | * | 10/2012 | Hozono | ............... | H04N 1/0249 |
| | | | | | | 358/475 |

* cited by examiner

*Primary Examiner* — Nicholas Pachol
(74) *Attorney, Agent, or Firm* — Wenderoth, Lind & Ponack, L.L.P.

(57) ABSTRACT

An illumination device includes a light emitting unit, a light guide member, and a support member. The light guide member has a flat plate part that extends in the longitudinal direction and a light guide body, and is molded such that a sectional shape vertical to the longitudinal direction is a hat shape. The support member has a pair of end support parts that support both end parts in the longitudinal direction of the light guide member and a flat plate part-support part that supports a surface of the flat plate part of the light guide member, which is opposite to a side of the light guide body. A support surface of the flat plate part-support part abuts the surface in an entire area in the longitudinal direction of the surface of the light guide member.

8 Claims, 18 Drawing Sheets

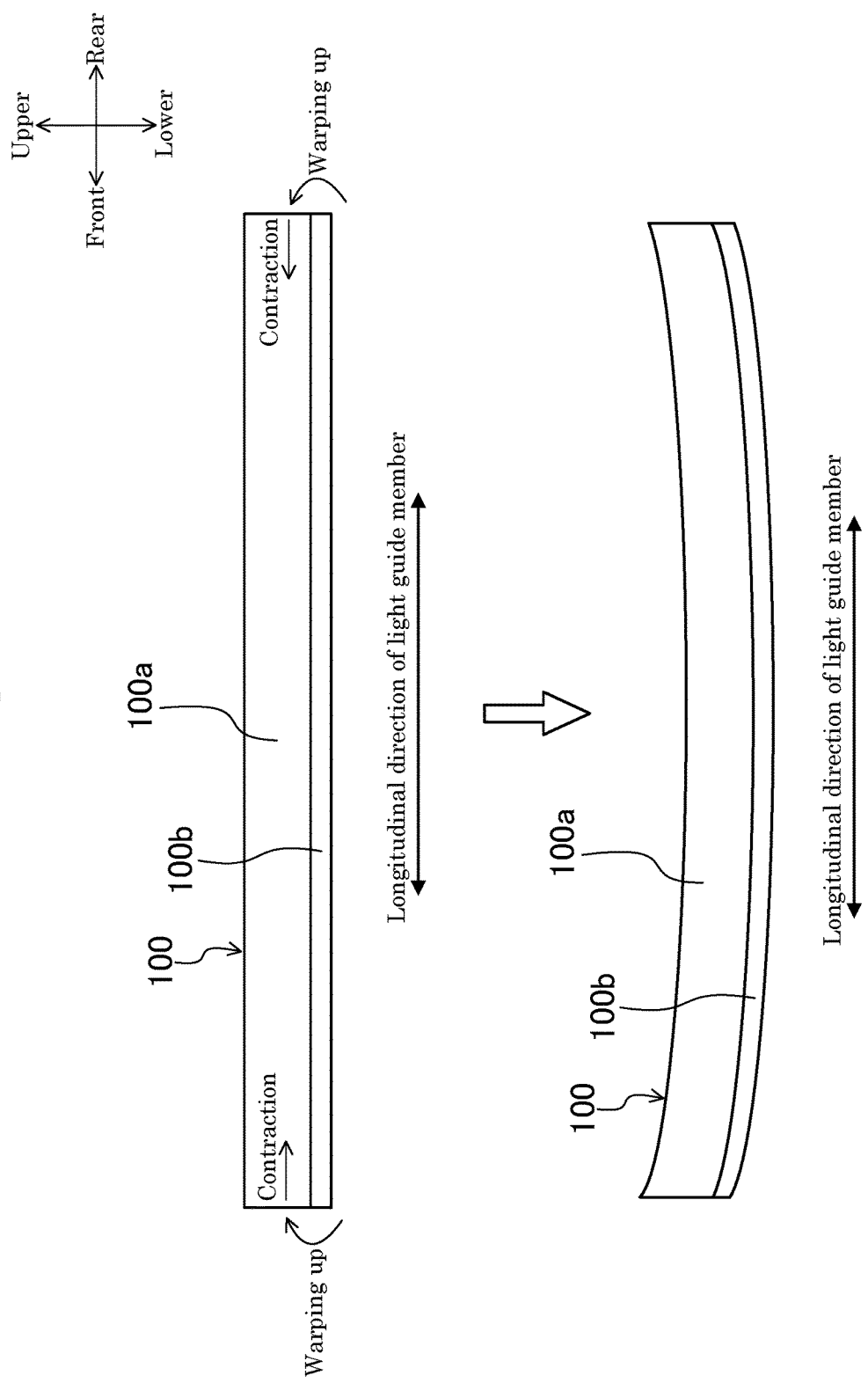

ILLUMINATION DEVICE HAVING A SUPPORT MEMBER FOR SUPPORTING A LIGHT GUIDE MEMBER AND IMAGE READING DEVICE INCLUDING THE SAME

CROSS-REFERENCE TO RELATED APPLICATION

This application is based upon and claims the benefit of priority from Japanese Patent Application No. 2017-176990 filed on Sep. 14, 2017, the entire contents of which are incorporated herein by reference.

BACKGROUND

The technology of the present disclosure relates to an illumination device and an image reading device including the same.

In the related art, there has been known an image reading device that illuminates linear light toward a document placed on a document table and leads reflected light to a photoelectric conversion unit (for example, a CCD sensor) via a mirror and the like, thereby reading an image of the document.

In this type of image reading device, there has been proposed an illumination device using a light emitting diode and a rod-like light guide member in order to generate linear light. One end part of the light guide member faces the light emitting diode. The light guide member is formed on the outer peripheral surface thereof with a light emitting part extending in a longitudinal direction of the light guide member. Light emitted from the light emitting diode is diffused to the whole area in the longitudinal direction by the light guide member, and is emitted from the light emitting part as linear light.

As a molding method of the light guide member, there has been known a method in which a mold is divided into a plurality of (for example, four) molds in a circumferential direction when viewed from the longitudinal direction of the light guide member and each split mold is radially opened/closed in a radial direction.

SUMMARY

An illumination device according to one aspect of the present disclosure includes a light emitting unit, a light guide member, and a support member. The light guide member has a rod shape. One end part in a longitudinal direction of the light guide member faces the light emitting unit. Furthermore, the light guide member is formed on the peripheral surface thereof with a light emitting part extending in the longitudinal direction. The support member covers an opposite side of a side of the light emitting part of the light guide member and supports both end parts in a longitudinal direction of the light guide member.

Furthermore, the light guide member has a flat plate part and a light guide body. The flat plate part extends in the longitudinal direction. The light guide body protrudes from one side surface in a thickness direction of the flat plate part and is formed over an entire area in the longitudinal direction. The light guide body is provided on the peripheral surface thereof with the light emitting part. The light guide body is formed such that a sectional shape vertical to the longitudinal direction is a hat shape.

The support member has a pair of end support parts and a flat plate part-support part. The pair of end support parts support both end parts in the longitudinal direction of the light guide member. The flat plate part-support part supports a surface of the flat plate part of the light guide member, which is opposite to a side of the light guide body. A support surface of the flat plate part-support part abuts the surface in an entire area in the longitudinal direction of the surface of the light guide member.

BRIEF DESCRIPTION OF THE DRAWINGS

FIG. 19 is a view illustrating analysis of a generation factor of warping when a light guide member having a hat shape is molded.

DETAILED DESCRIPTION

Hereinafter, an example of an embodiment will be described in detail on the basis of the drawings. It is noted that the technology of the present disclosure is not limited to the following embodiments.

Figure 1:
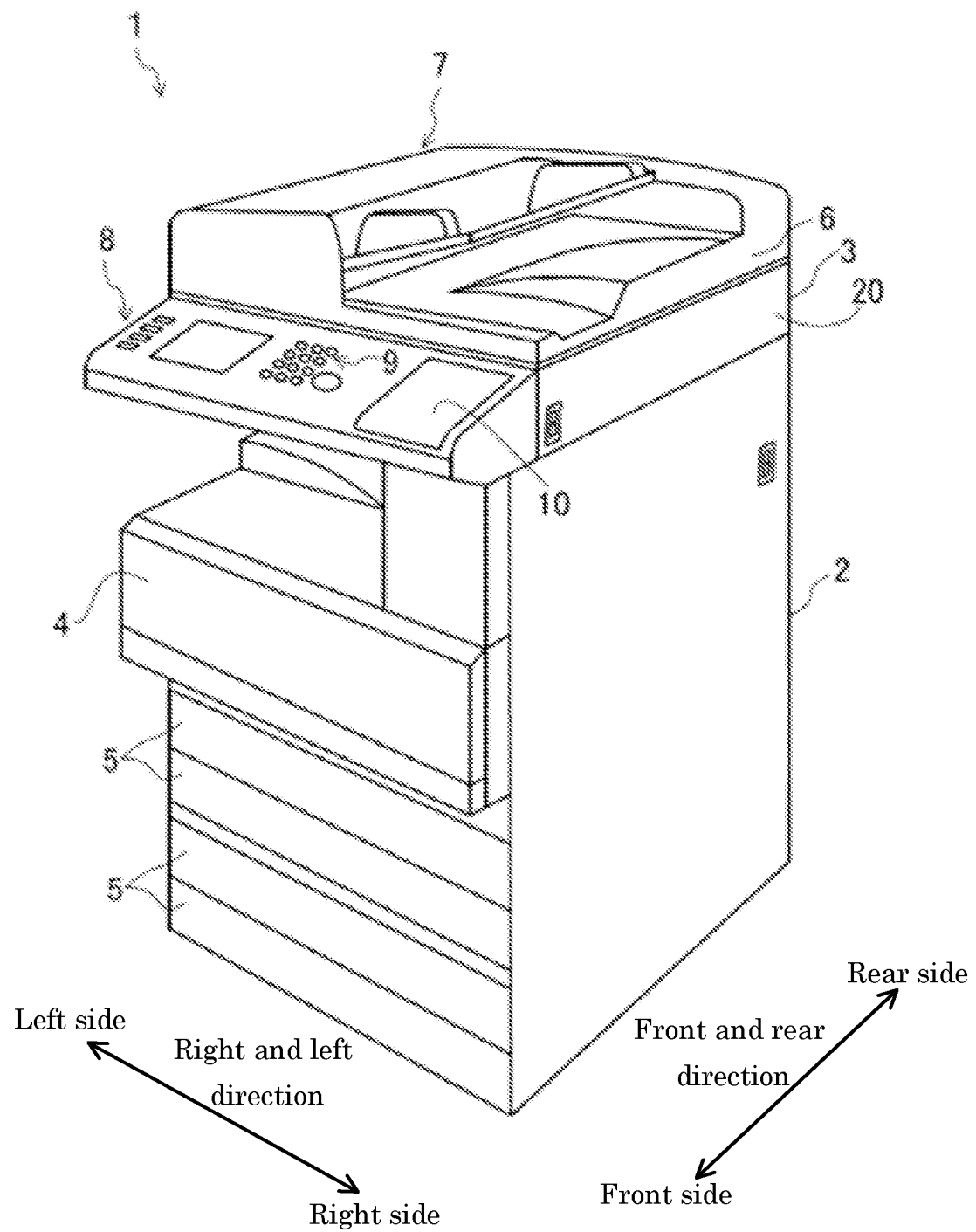
FIG. 1 is an external appearance perspective view of an image forming apparatus in which an image reading device having an illumination device in an embodiment is mounted.

FIG. 1 illustrates a schematic configuration diagram of an image forming apparatus 1 including an illumination device 40 in an embodiment. The image forming apparatus 1 is a composite type image forming apparatus (a multifunctional peripheral) having a scanner function, a facsimile function, and a copy function in addition to a print function. In the following description, it is assumed that a front side and a rear side indicate a front side and a rear side of the image forming apparatus 1, a left side and a right side indicate a left side and a right side when the image forming apparatus 1 is viewed from the front side (a side of an operation panel 8 to be described later), and an upper side and a lower side indicate an upper side and a lower side of the image forming apparatus 1.

As illustrated in FIG. 1, the image forming apparatus 1 includes an image forming apparatus body 2 and an image reading device 3 disposed above the image forming apparatus body 2. The image forming apparatus body 2 has a print unit 4 disposed at an intermediate part in an up and down direction of the image forming apparatus body 2, and a plurality of sheet feeding cassettes 5 disposed below the print unit 4. The sheet feeding cassettes 5 receive different sizes of sheets therein respectively. The print unit 4 performs printing on the sheet supplied from the sheet feeding cassettes 5 on the basis of predetermined image data. As a printing scheme of the print unit 4, an electrophotographic scheme is employed. That is, the print unit 4 forms an electrostatic latent image by irradiating a surface of a photosensitive drum with laser light corresponding to image data, develops the electrostatic latent image by using toner, and transfers the developed image to the sheet.

For Image Reading Device

Figure 2:
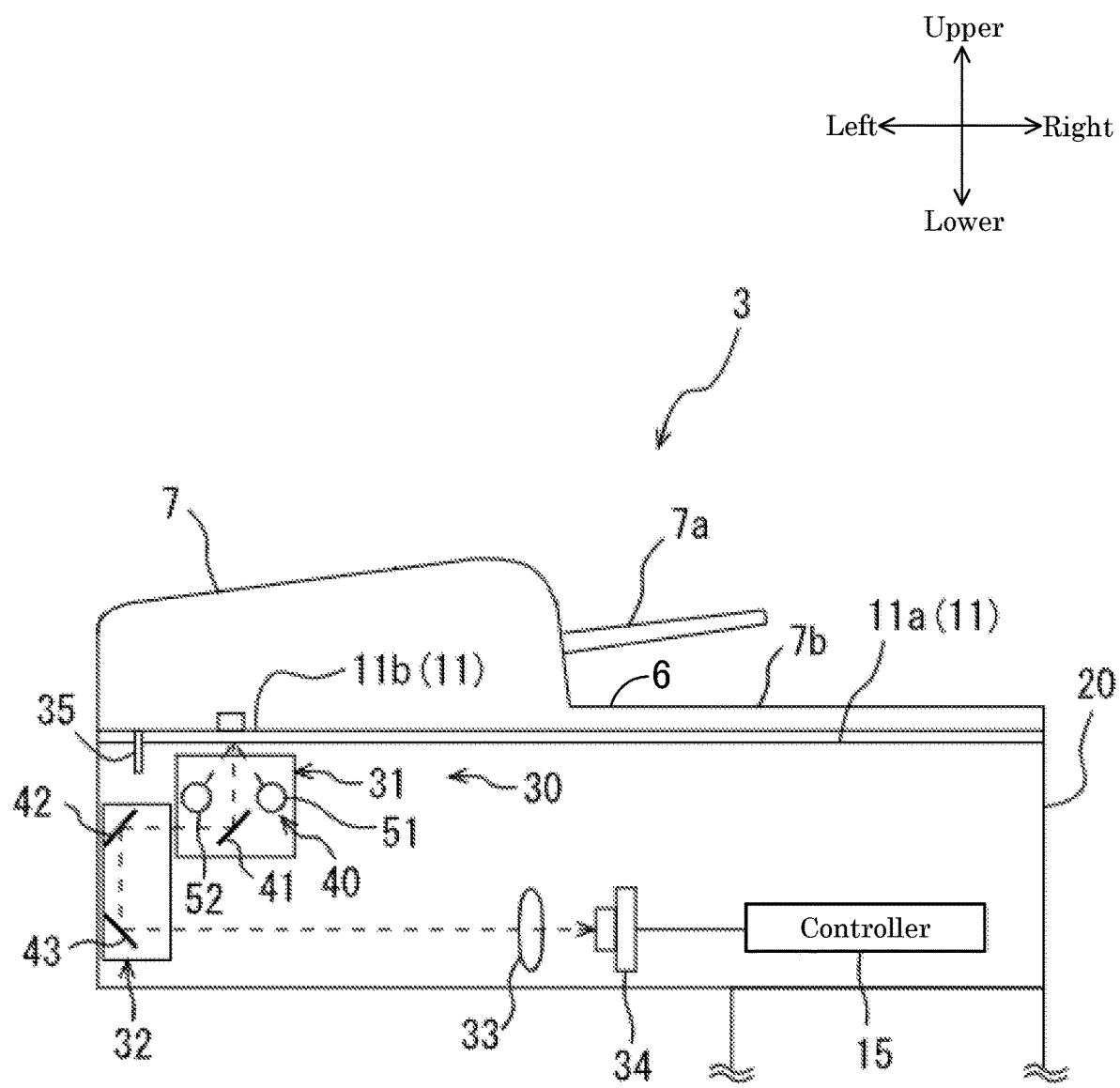
FIG. 2 is a schematic configuration diagram illustrating an image reading device in an embodiment.
Figure 3:
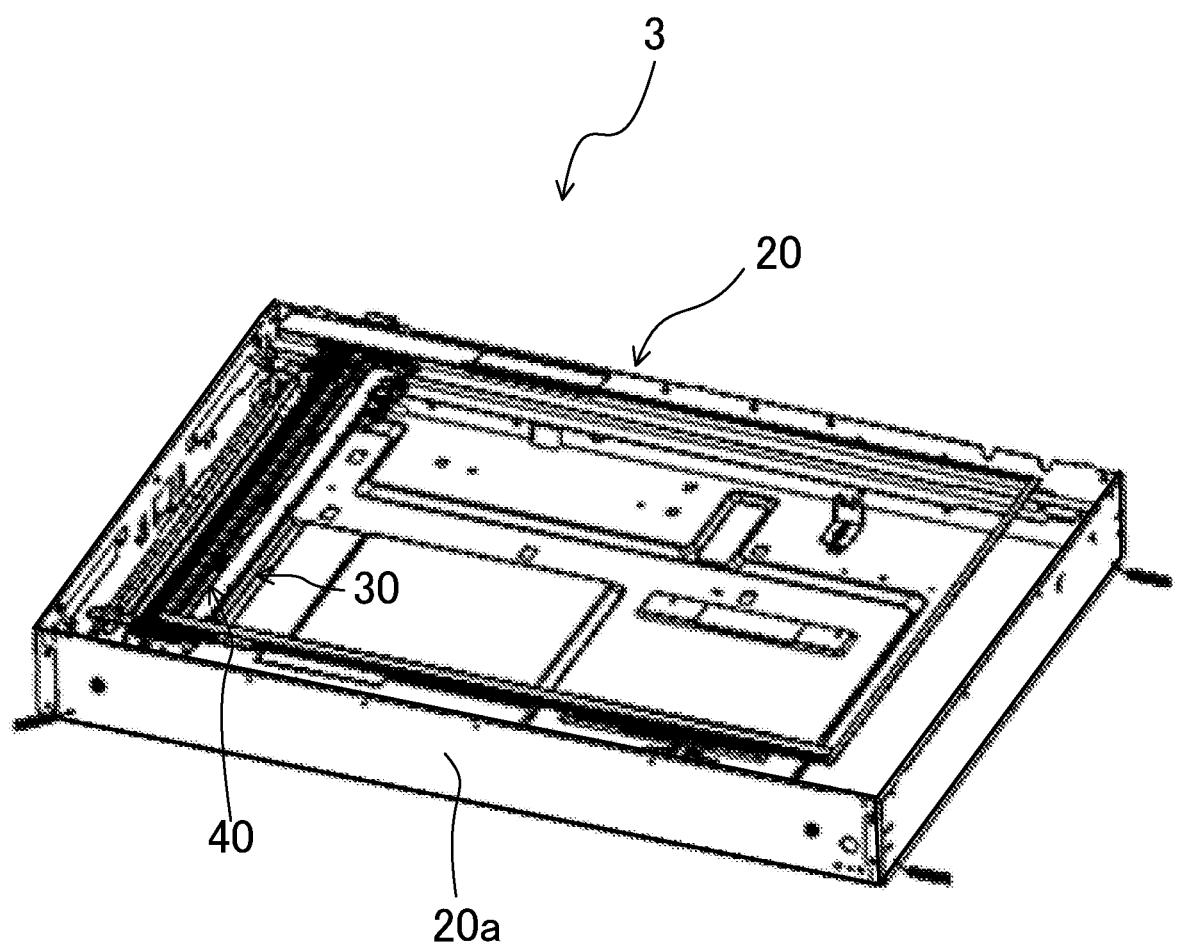
FIG. 3 is an external appearance perspective view illustrating an image reading device in an embodiment.

FIG. 2 illustrates a schematic configuration diagram of the image reading device 3 in the embodiment. FIG. 3 illustrates a perspective view of a housing 20 of the image reading device 3 in the embodiment. The image reading device 3 is a device that optically reads an image of a document (a document sheet) on a contact glass 11 and generates image data corresponding to the image of the document. In the present embodiment, for the image reading device 3, a front and rear direction corresponds to a "main scanning direction" and a right and left direction corresponds to a "sub-scanning direction".

As illustrated in FIG. 2, the image reading device 3 includes the housing 20 provided on the upper surface thereof with the contact glass 11, a document cover 6 that is mounted at the housing 20 so as to be openable and closable and covers the upper surface of the contact glass 11 in a closed state, and a reading unit 30 received in the housing 20. The document cover 6 is integrally formed with an automatic document feeder (ADF) 7. In addition, as illustrated in FIG. 1, from a front surface part of the image reading device 3, the operation panel 8 is formed to protrude. The operation panel 8 is provided with an operation unit 9 including a numeric keypad and a start key, and a display unit 10 including a liquid crystal display.

The image reading device 3 performs a document reading operation that reads an image of a document. The document reading operation includes a manual mode in which a document placed on the contact glass 11 by a user is read, and an automatic sheet feeding mode in which a document automatically supplied by the automatic document feeder 7 is read.

The housing 20 includes an approximately rectangular parallelepiped-like box body 20a (see FIG. 3) opened upward, and the contact glass 11 mounted at an upper opening of the box body 20a. FIG. 3 illustrates a state in which the contact glass 11 has been removed. As illustrated in FIG. 2, the contact glass 11 includes a first contact glass 11a on which a document to be read in the document reading operation of the manual mode is placed, and a second contact glass 11b having an upper side through which a document to be read in the document reading operation of the automatic sheet feeding mode passes. The first contact glass 11a is formed in a rectangular plate shape and occupies a wide range on the upper surface of the housing 20. The second contact glass 11b is formed in a rectangular plate shape elongated in the front and rear direction and is disposed at a left side of the first contact glass 11a on the upper surface of the housing 20.

The document cover 6 is placed at the upper side of the housing 20. The document cover 6 is mounted at the housing 20 so as to be openable and closable by using a hinge (not illustrated) provided at a rear end part of the housing 20 as a fulcrum. The document cover 6 covers an approximate entire area of the upper surface of the housing 20 in a closed state.

The automatic document feeder 7 is received in the document cover 6. The automatic document feeder 7 conveys a document set in a document feeding tray 7a along a predetermined conveyance path and allows the document to pass through a reading position on the second contact glass 11b. The document having passed through the reading position is discharged to a document discharge tray 7b.

As illustrated in FIG. 2, the reading unit 30 includes a first moving carriage 31, a second moving carriage 32, a condensing lens unit 33, and an imaging element 34. In the first moving carriage 31, an illumination device 40 and a first reflecting mirror 41 are installed. In the second moving carriage 32, a second reflecting mirror 42 and a third reflecting mirror 43 are installed.

In the reading unit 30, when each of the document reading operation and a document size detection operation is performed, the illumination device 40 irradiates a document on the contact glass 11 with light. Reflection light reflected from the document surface after the irradiation from the illumination device 40 is reflected in sequence of the first reflecting mirror 41, the second reflecting mirror 42, and the third reflecting mirror 43. The second reflecting mirror 42 and the third reflecting mirror 43 invert an optical path. The reflected light of the third reflecting mirror 43 passes through the condensing lens unit 33, so that an image of the reflected light is formed on an imaging surface of the imaging element 34. The imaging element 34 includes a charge coupled device (CCD) and the like and photoelectrically converts the light received in the imaging surface into an analog electric signal. The analog electric signal is converted into a digital electric signal by an A/D conversion circuit (not illustrated) and then is inputted to a controller 15 as image data.

The moving carriages 31 and 32 are driven by a driving mechanism (not illustrated) using a driving motor such as a stepping motor. The first moving carriage 31 reciprocally moves along the lower surfaces of the first contact glass 11a and the second contact glass 11b in the right and left direction. The second moving carriage 32 reciprocally moves in the right and left direction by a half of an amount of movement of the first moving carriage 31 while following the first moving carriage 31. Specifically, in the document reading operation of the manual mode, the first moving carriage 31 moves in the right direction from directly under (a home position) the left end of the first contact glass 11a.

In this movement, light is irradiated toward a document from the illumination device 40. On the other hand, in the document reading operation of the automatic sheet feeding mode, the first moving carriage 31 moves directly under the second contact glass 11b and enters a stationary state. In this stationary state, light is irradiated toward a document from the illumination device 40.

For Illumination Device

Figure 4:
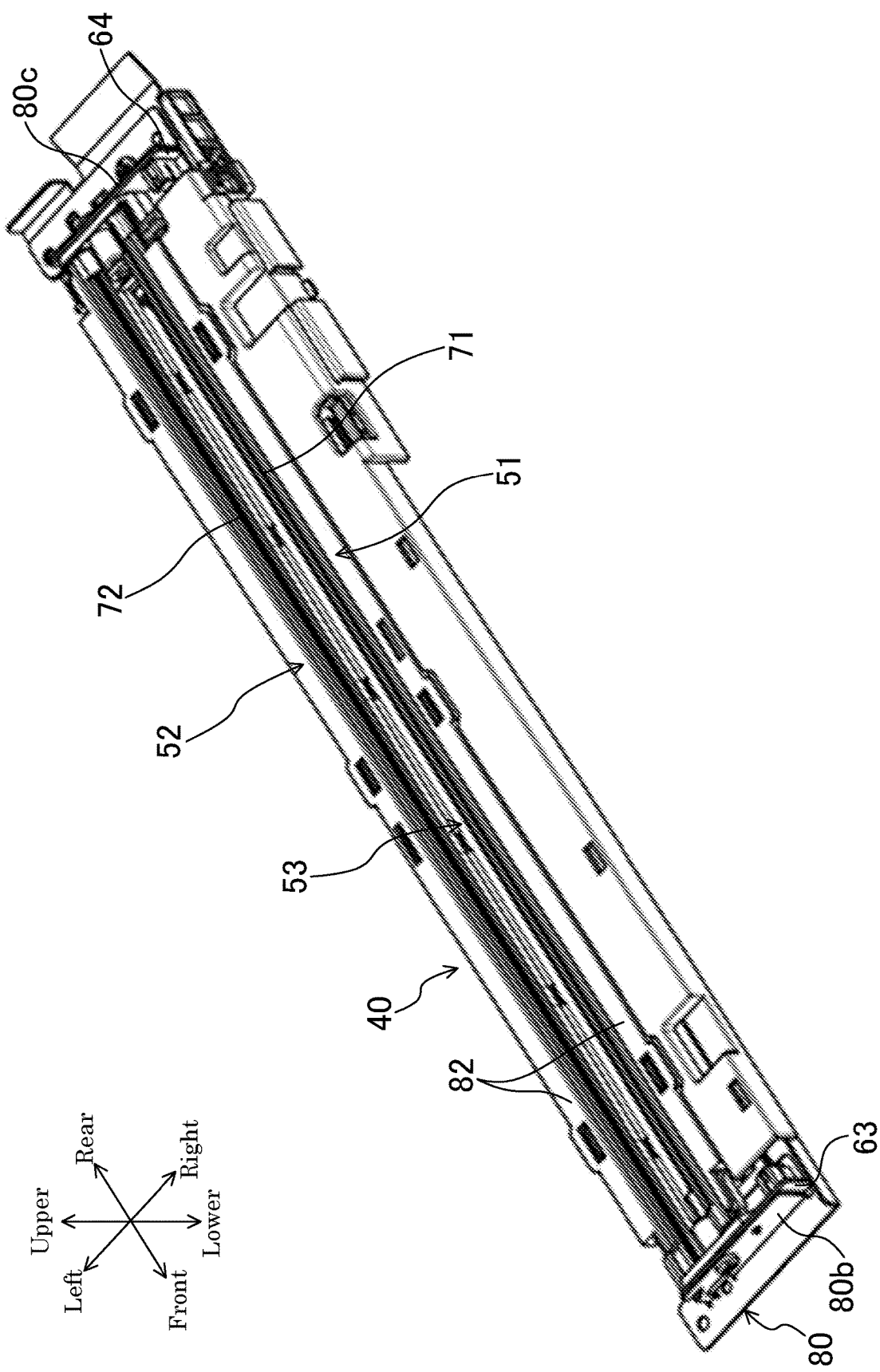
FIG. 4 is an external appearance perspective view of an illumination device of the present embodiment mounted in a carriage of an image reading device.

The illumination device 40 irradiates illumination light by employing a document on the contact glass 11 as a focal position. As illustrated in FIG. 4, the illumination device 40 includes a first illumination unit 51 and a second illumination unit 52 that irradiate linear illumination light long in the front and rear direction, and a resinous support member 53 that support the first illumination unit 51 and the second illumination unit 52. The illumination device 40 irradiates light at a position facing the first contact glass 11a or the second contact glass 11b in accordance with the position of the first moving carriage 31. The first illumination unit 51 and the second illumination unit 52 have the same configuration.

Figure 5:
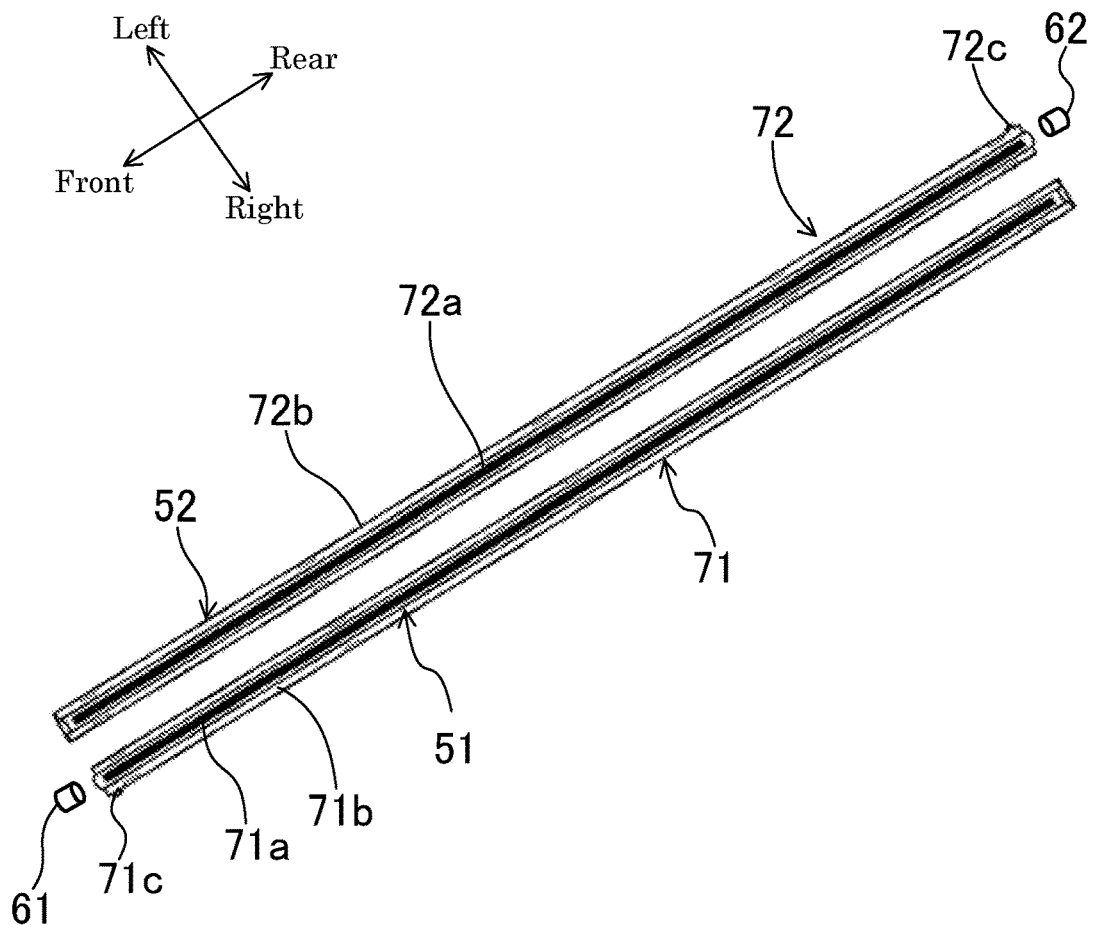
FIG. 5 is a perspective view of an illumination unit constituting an illumination device.

As illustrated in FIG. 5, the first illumination unit 51 includes a first light source 61 and a straight rod-like first light guide member 71. The second illumination unit 52 includes a second light source 62 and a straight rod-like second light guide member 72. In the illumination units 51 and 52, each light guide members 71 and 72 is provided with one light source 61 and one light source 62 (corresponding to light emitting units) respectively. In the illumination device 40, the two light sources 61 and 62 are provided.

Each of the light sources 61 and 62 is a white light emitting diode (LED) having a thin disc shape and emitting white light. As an example of the white LED, it is possible to use a high luminance LED package. The high luminance LED package is configured by sealing a GaN-based or InGaN-based semiconductor light emitting element for emitting blue light or ultraviolet light with transparent resin containing a fluorescent substance. Furthermore, the shape of the white LED is not limited to the disc shape and can employ a square shape. Each of the light sources 61 and 62 is disposed facing one end surface of each of the light guide members 71 and 72. The light sources 61 and 62 are mounted on LED boards 63 and 64, respectively (see FIG. 4).

Figure 6:
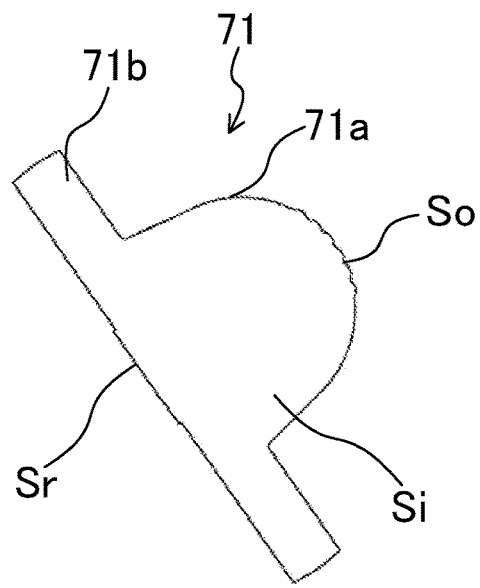
FIG. 6 is a sectional view when a light guide member is taken along section vertical to a longitudinal direction.

Each of the light guide members 71 and 72 is formed by a light transmitting resin material such as acrylic resin. As illustrated in FIG. 5 and FIG. 6, the light guide members 71 and 72 have light guide bodies 71a and 72a, flat plate parts 71b and 72b, and claw parts 71c and 72c, respectively. The light guide bodies 71a and 72a are column parts having approximately semicircular sections extending in the front and rear direction. The light guide bodies 71a and 72a protrude from center parts in the width direction of the flat plate parts 71b and 72b extending in the front and rear direction. FIG. 6 illustrates the sectional shape of only the first light guide member 71; however, the second light guide member 72 have the same sectional shape as that of the first light guide member 71. Each of the light guide members 71 and 72 has a sectional hat shape as illustrated in FIG. 6. Each of the claw parts 71c and 72c protrudes from an outer end part in the right and left direction of each of the flat plate parts 71b and 72b at an end part of a light incident part Si side of each of the light guide members 71 and 72 as illustrated in FIG. 5. It is noted that the other drawings, other than FIG. 6, do not illustrate reference numerals So, Si, and Sr for the purpose of visibility.

In the light guide members 71 and 72, incident light from end surfaces facing the light sources 61 and 62 respectively corresponding to the light guide members 71 and 72 propagates, is converted into linear illumination light, and is emitted. Specifically, in each of the light guide members 71 and 72, one end surface facing each of the light sources 61 and 62 serves as the light incident part Si (see FIG. 6), an upper surface (a surface facing the contact glass 11) is formed with a light emitting part So for emitting light, and a surface (an opposite surface of the light emitting part So) facing the light emitting part So is formed with a light reflecting part Sr. The light emitting part So and the light reflecting part Sr are formed over the whole area in the front and rear direction of the light guide bodies 71a and 72a, respectively.

Figure 8:
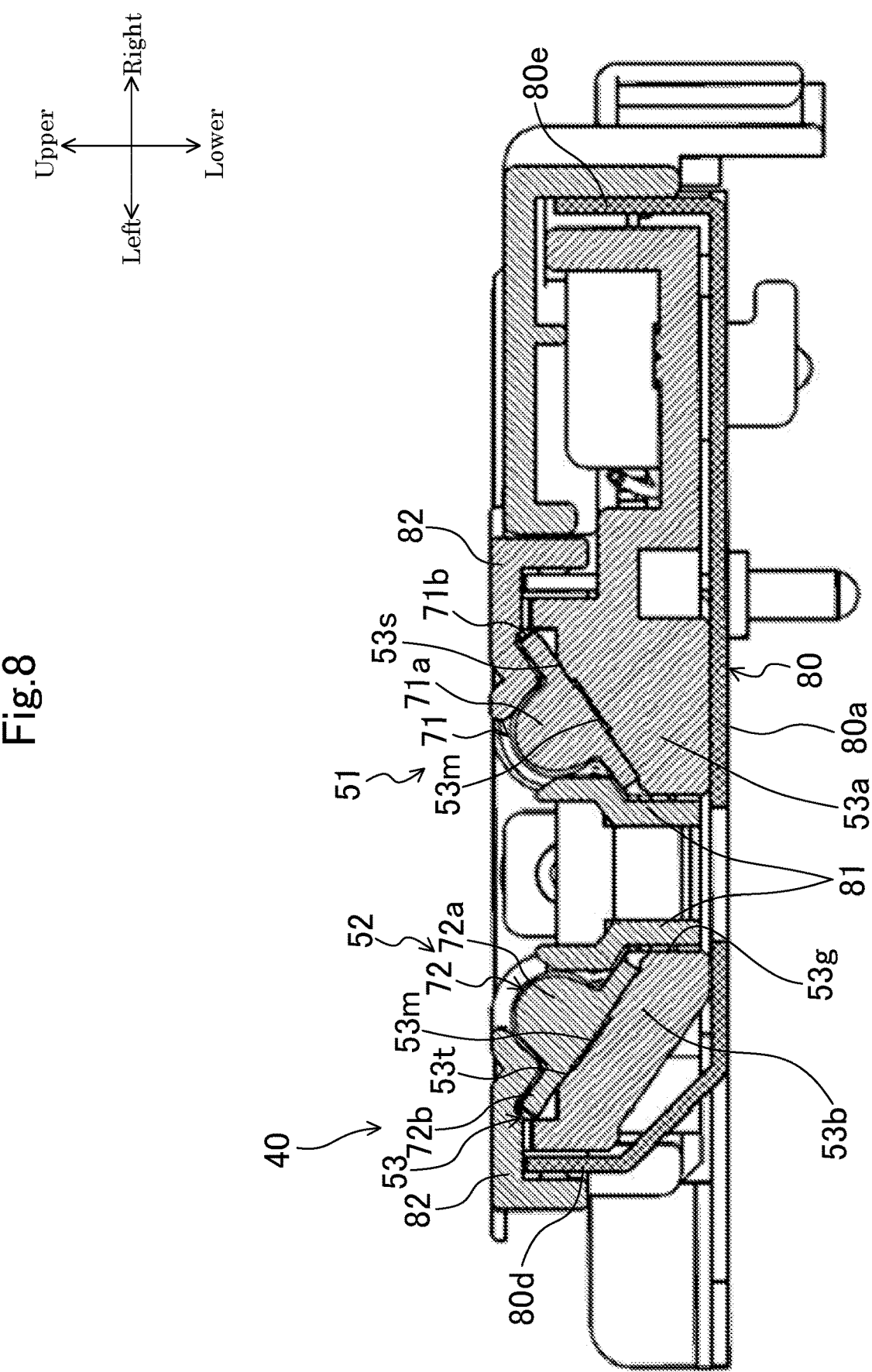
FIG. 8 is a sectional view when an illumination device is taken along a vertical surface along a right and left direction.

As illustrated in FIG. 8, the first light guide member 71 and the second light guide member 72 are mounted spaced apart from each other in the support member 53 in parallel to each other in the right and left direction. The support member 53 is mounted in the first moving carriage 31 (see FIG. 2) such that the light guide members 71 and 72 extend along the front and rear direction. The first light guide member 71 is disposed at a right side of the second light guide member 72 when viewed from the front side of the housing 20.

Furthermore, in the present embodiment, as illustrated in FIG. 5, the first light guide member 71 is mounted in the support member 53 such that the first light source 61 is positioned at the front side, and the second light guide member 72 is mounted in the support member 53 such that the second light source 62 is positioned at the rear side. The first light source 61 is positioned in a front side area of the housing 20 and emits incident light to the first light guide member 71 toward the rear side. The second light source 62 is positioned in a rear side area of the housing 20 and emits incident light to the second light guide member 72 toward the front side.

As illustrated in FIG. 8, the first light guide member 71 and the second light guide member 72 are supported by the support member 53 at the same height. In the support member 53, a path of light toward the first reflecting mirror 41 from the first contact glass 11a is formed inside between the first light guide member 71 and the second light guide member 72. The first light guide member 71 and the second light guide member 72 are inclined by a predetermined angle and are provided with an orientation in which the light emitting part So (see FIG. 6) are slightly directed inward. In the first light guide member 71, the light emitting part So faces the left obliquely upward when viewed from the front side of the housing 20. In the second light guide member 72, the light emitting part So faces the right obliquely upward when viewed from the front side of the housing 20.

Details of Support Member

Details of the support member 53 will be described with reference to FIG. 4, FIG. 7, and FIG. 8. The support member 53 is mounted at a bottom plate part of the first moving carriage 31 via a sheet metal member 80. The support member 53 is divided into a one side divided part 531 and the other side divided part 532 (see FIG. 15). The division structure of the support member 53 will be described later.

The sheet metal member 80 includes a bottom side sheet metal 80a on which the support member 53 is placed. Four sides of the support member 53 are surrounded by a front side sheet metal 80b, a rear side sheet metal 80c, a left side sheet metal 80d, and a right side sheet metal 80e, which are obtained by cutting and raising a part of the sheet metal member 80 as illustrated in FIG. 4. A lower surface of the support member 53 is supported by abutting the bottom side sheet metal 80a at both end parts and an intermediate part thereof in the front and rear direction (see FIG. 8). The entire lower surface of the support member 53 may be allowed to abut the bottom side sheet metal 80a.

Figure 7:
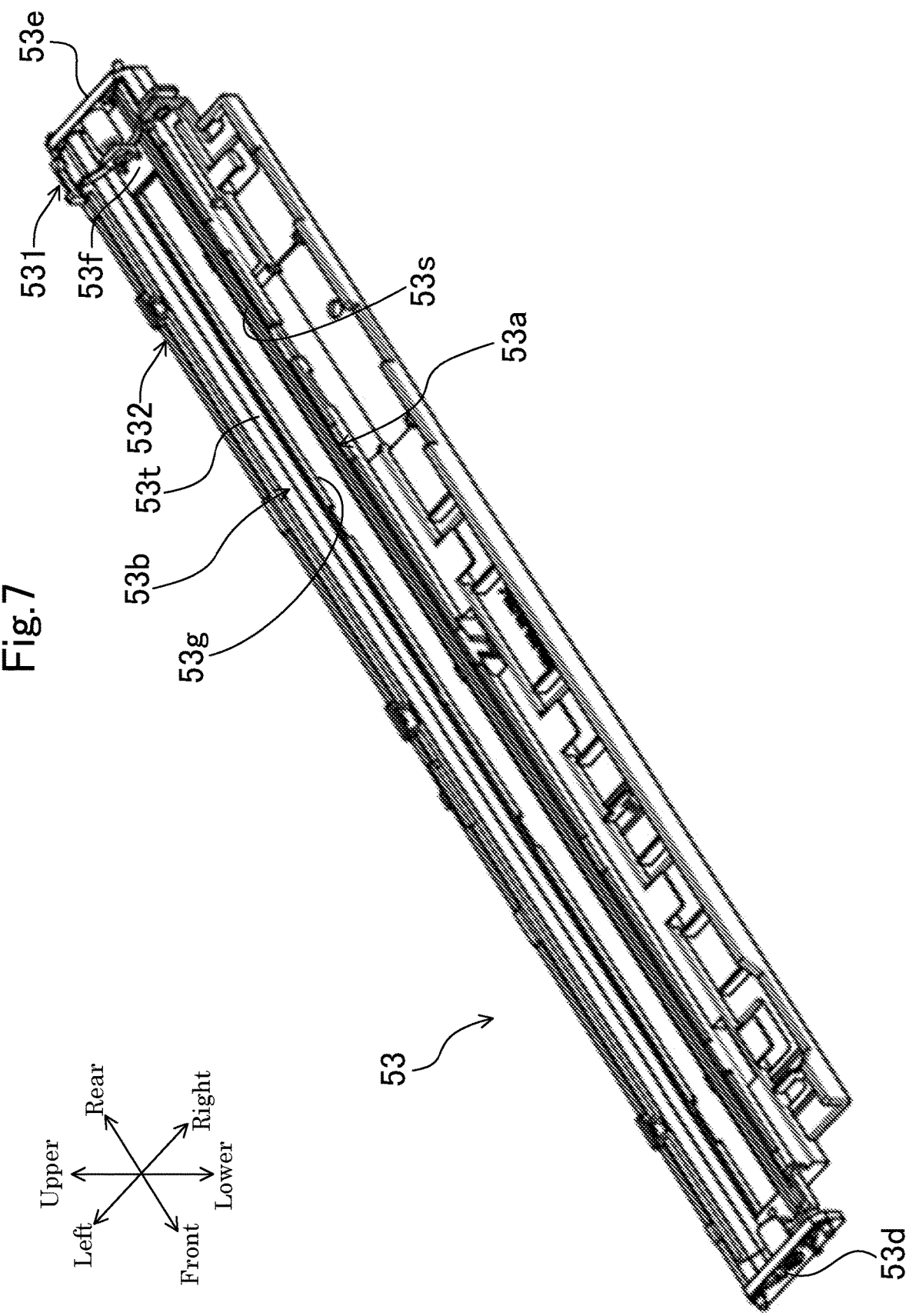
FIG. 7 is an external appearance perspective view illustrating a support member that supports a light guide member.

Referring to FIG. 7, the support member 53 has a first reflecting-side support part 53a, a second reflecting-side support part 53b, a front end support plate 53d, and a rear end support plate 53e. The first and second reflecting-side support parts 53a and 53b are disposed to extend in the front and rear direction in parallel to each other while being spaced apart from each other in the right and left direction. The first and second reflecting-side support parts 53a and 53b serve as flat plate support parts that support the flat plate parts 71b and 72b of the first and second light guide members 71 and 72 from the sides of the light reflecting parts Sr (see FIG. 6), respectively. The reflecting-side support parts 53a and 53b are connected to each other via a flat plate 53f extending in the front and rear direction. The flat plate 53f is formed with a rectangular through hole 53g extending in the front and rear direction. In the through hole 53g, a pair of inner pressing members 81, which will be described later, are disposed by passing through the through hole 53g in an up and down direction.

Referring to FIG. 8, a support surface 53s of the first reflecting-side support part 53a and a support surface 53t of the second reflecting-side support part 53b are inclined such that inner end edges are lower than outer end edges when viewed from the front and rear direction. The support surfaces 53s and 53t become white reflecting surfaces capable of reflecting light toward the inner sides of the light guide members 71 and 72. The reflecting surfaces are not limited to the white color and it is sufficient if the reflecting surfaces have colors with high reflectivity of light or the reflecting surfaces may be made of a material that easily reflects light or may be subjected to a surface treatment. The first reflecting-side support part 53a and the second reflecting-side support part 53b serve as reflecting surface formation parts.

The support surfaces 53s and 53t abut the lower surfaces of the flat plate parts 71b and 72b of the light guide members 71 and 72 in the whole area in the front and rear direction thereof, respectively. Each of the support surfaces 53s and 53t is formed at the center part in the width direction thereof with a dish-like groove 53m extending in the front and rear direction. In the groove 53m, the light reflecting parts Sr of the lower surfaces of the light guide members 71 and 72 are received. Surfaces of the grooves 53m become reflecting surfaces capable of reflecting light toward the inner sides of the light guide members 71 and 72.

Figure 9:
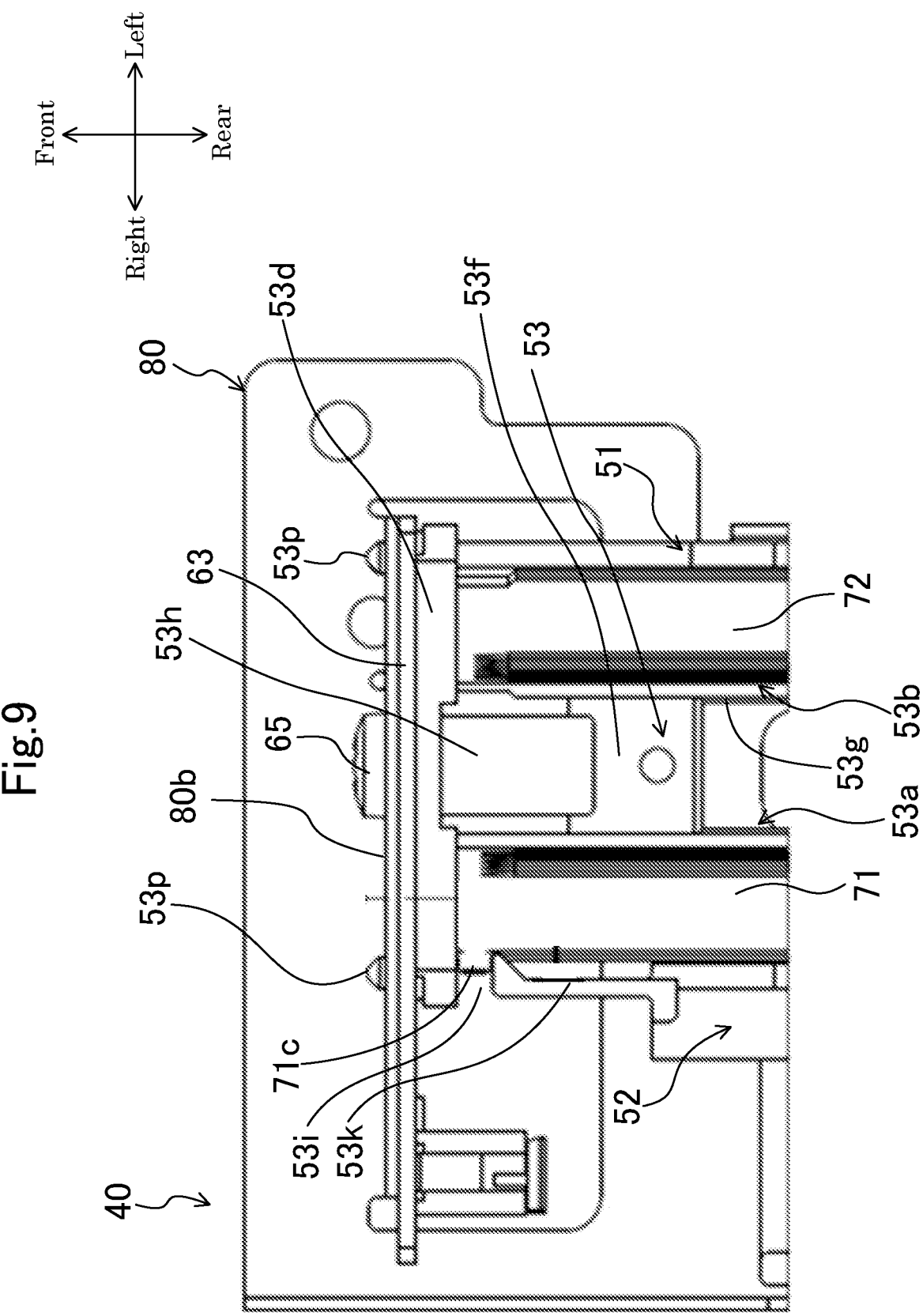
FIG. 9 is an enlarged plan view of a front end part of an illumination device.

As illustrated in FIG. 9, each of the first and second reflecting-side support parts 53a and 53b is formed at one end in the front and rear direction thereof with an engaging groove 53i (FIG. 9 illustrates only the engaging groove 53i engaged with one claw part 71c) engaged with each of the claw parts 71c and 72c of the light guide members 71 and 72. The engaging groove 53i is formed by cutting a part of an outside bank part 53k extending in the front and rear direction. Each of the claw parts 71c and 72c of the light guide members 71 and 72 is engaged with the engaging groove 53i, so that each of the light guide members 71 and 72 is restricted to be movable in the front and rear direction. The claw parts 71c and 72c of the light guide members 71 and 72 are formed at ends of sides at which the light sources 61 and 62 (see FIG. 5) corresponding to the light guide members 71 and 72 are positioned. Consequently, when the light guide members 71 and are thermally expanded in the front and rear direction, distances between the light guide members 71 and 72 and the corresponding light sources 61 and 62 rarely changes. Consequently, it is possible to suppress a variation in the amount of light incident into the light guide members 71 and 72 from the light sources 61 and 62.

Figure 10:
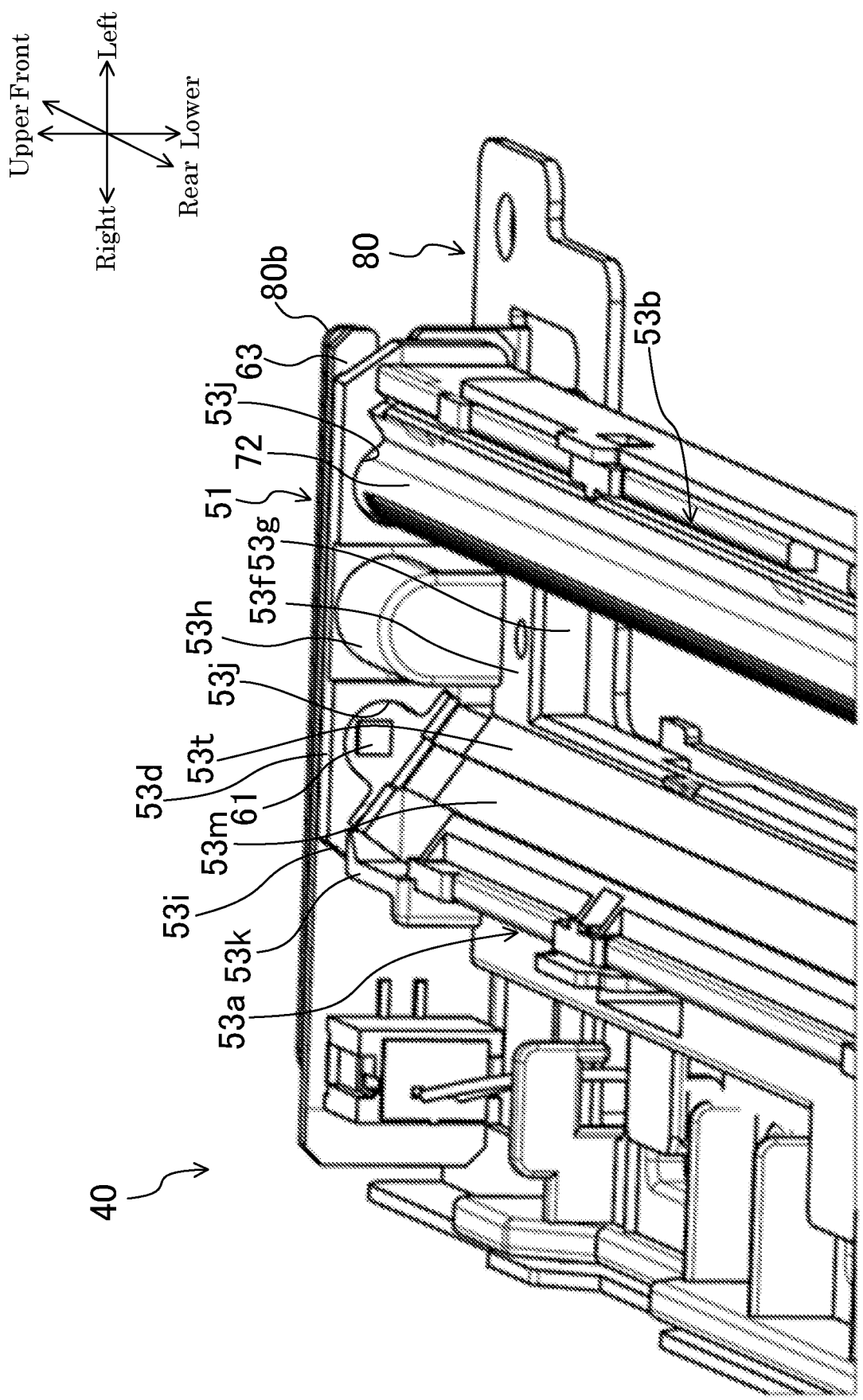
FIG. 10 is a perspective view when a front end part of an illumination device is viewed from a position closer to a rear side and is a view illustrating a state in which a first light guide member has been removed.

Referring to FIG. 7, the front end support plate 53d and the rear end support plate 53e are disposed facing each other in the front and rear direction while interposing the first and second reflecting-side support parts 53a and 53b therebetween. As illustrated in FIG. 10, each of the end support plates 53d and 53e (FIG. 10 illustrates only the end support plate 53d) is formed with a pair of fitting holes 53j fitted with each of the light guide members 71 and 72. The front end part of each of the light guide members 71 and 72 is fitted in the pair of fitting holes 53j of the front end support plate 53d and is supported thereto. The rear end part of each of the light guide members 71 and 72 is fitted in the pair of fitting holes 53j of the rear end support plate 53e and is supported thereto. Each of the fitting holes 53j is formed in a hat shape corresponding to the sectional shape of each of the light guide members 71 and 72. The ends of each of the light guide members 71 and 72 are fitted in the fitting holes 53j, so that they are non-rotatably restricted.

Figure 11:
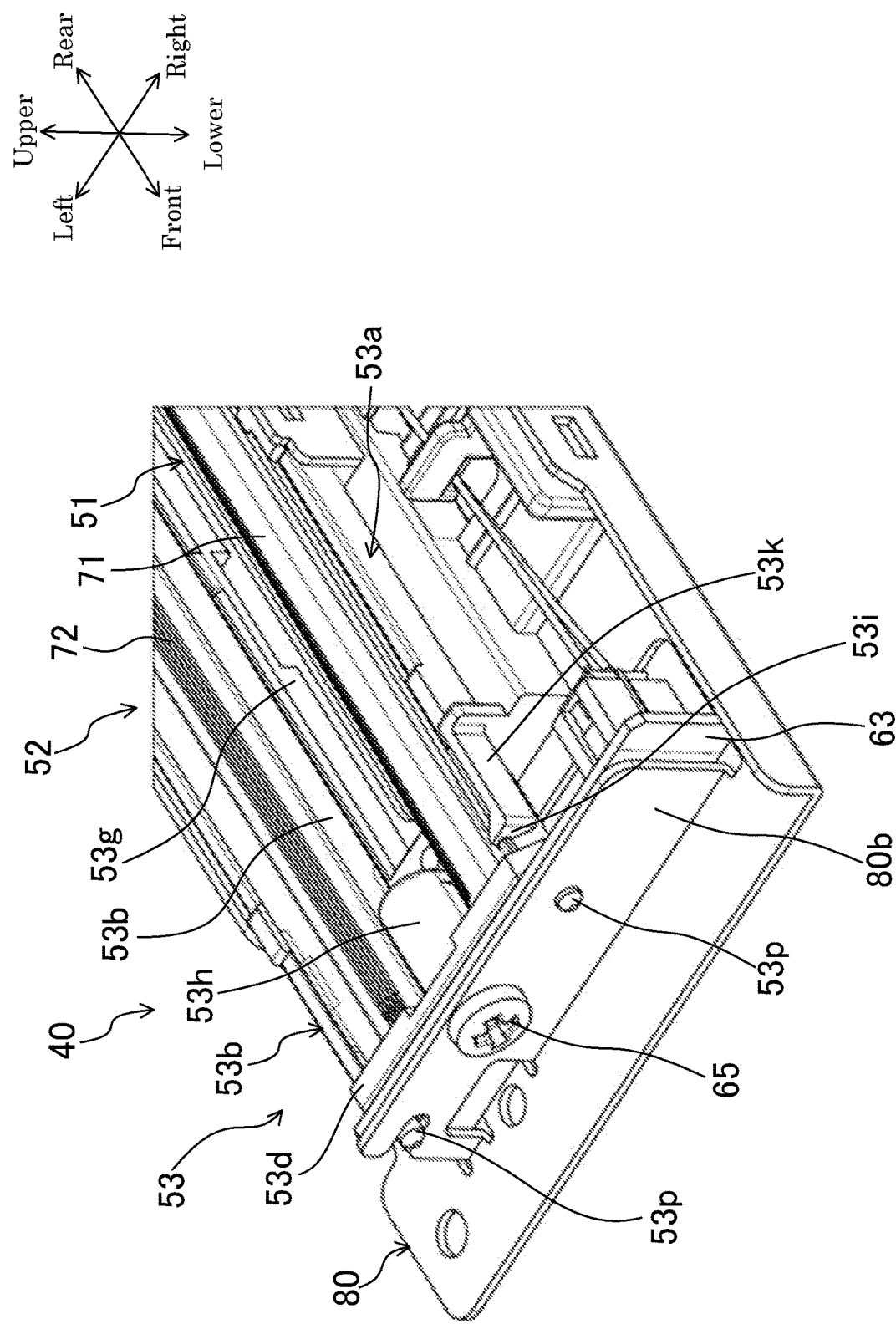
FIG. 11 is a perspective view when a front end part of an illumination device is viewed from a position closer to a front side.
Figure 12:
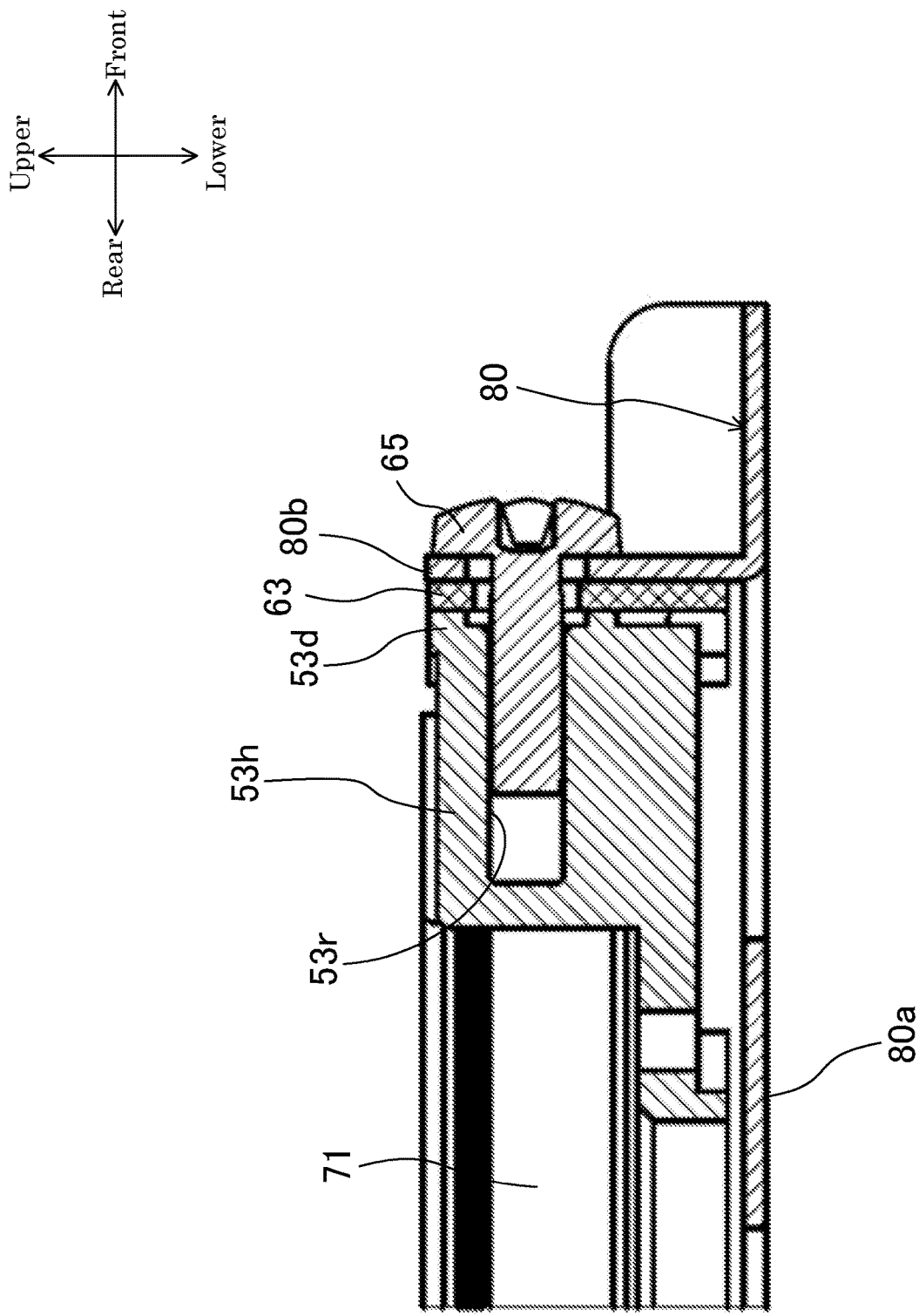
FIG. 12 is a sectional view when an illumination device in FIG. 11 is taken along a vertical surface along a shaft line of a boss part.

From each of the front end support plate 53d and the rear end support plate 53e, a columnar boss part 53h protrudes. FIG. 10 to FIG. 12 illustrate the boss part 53h protruding from the front end support plate 53d. The boss part 53h is formed between the pair of fitting holes 53j in each of the end support plates 53d and 53e. Each of the boss part 53h is formed with a screw hole 53r (illustrated only in FIG. 12) having a predetermined depth toward a distal end side from a base end side. Each of the end support plates 53d and 53e is jointly fastened and fixed to the front side and rear side sheet metals 80b and 80c by using a bolt 65 together with the LED boards 63 and 64 (FIG. 12 illustrates only the LED board 63). As illustrated in FIG. 11, from the outer side surface of each of the end support plates 53d and 53e, a pair of pins 53p for positioning with respect to the front side and rear side sheet metals 80b and 80c protrude. The front LED board 63 is mounted with the first light source 61 (see FIG. 10) and the rear LED board 64 is mounted with the second light source 62. The bolt 65 is screwed into the screw hole 53r of the boss part 53h by passing through the front side and rear side sheet metals 80b and 80c and the LED boards 63 and 64 disposed overlappingly with the sheet metals 80b and 80c (for example, see FIG. 12).

Configuration of Pressing Member

Returning to FIG. 8, the illumination device 40 further includes a pair of inner pressing members 81 that press the inner ends of the first and second light guide members 71 and 72 to the support surfaces 53s and 53t, and a pair of outer pressing members 82 that press the outer ends of the first and second light guide members 71 and 72 to the support surfaces 53s and 53t.

The inner pressing members 81 are disposed at both right and left ends of the through hole 53g formed in the flat plate 53f. Lower ends of the inner pressing members 81 are engaged with and fixed to the bottom side sheet metal 80a of the sheet metal member 80. The inner pressing members 81 vertically extend from the bottom side sheet metal 80a, are bent to an obliquely upper side toward an outer side in the right and left direction, and then are vertically bent up.

Figure 13:
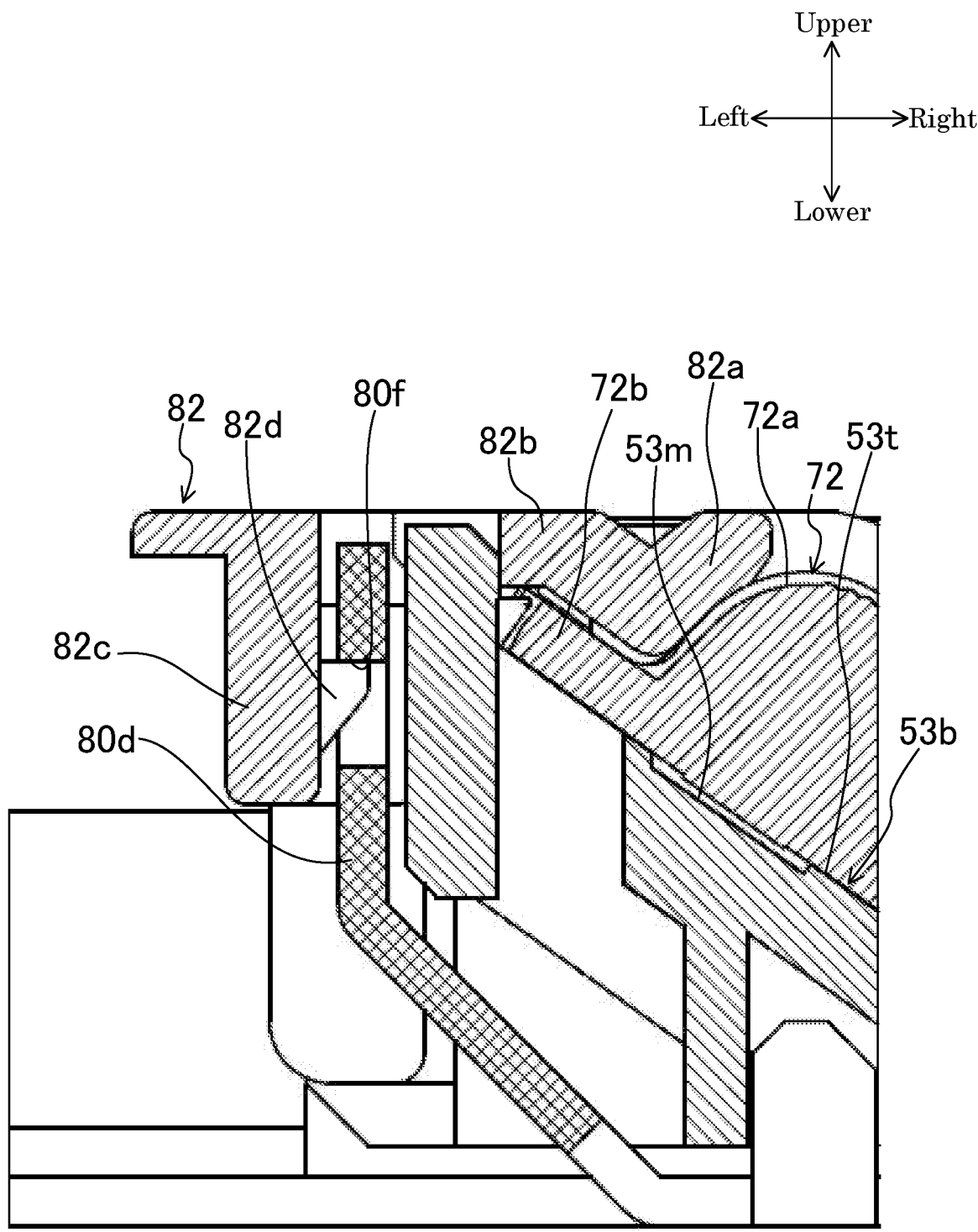
FIG. 13 is a sectional view illustrating a mounting structure of an outer pressing member with respect to a sheet metal member.
Figure 14:
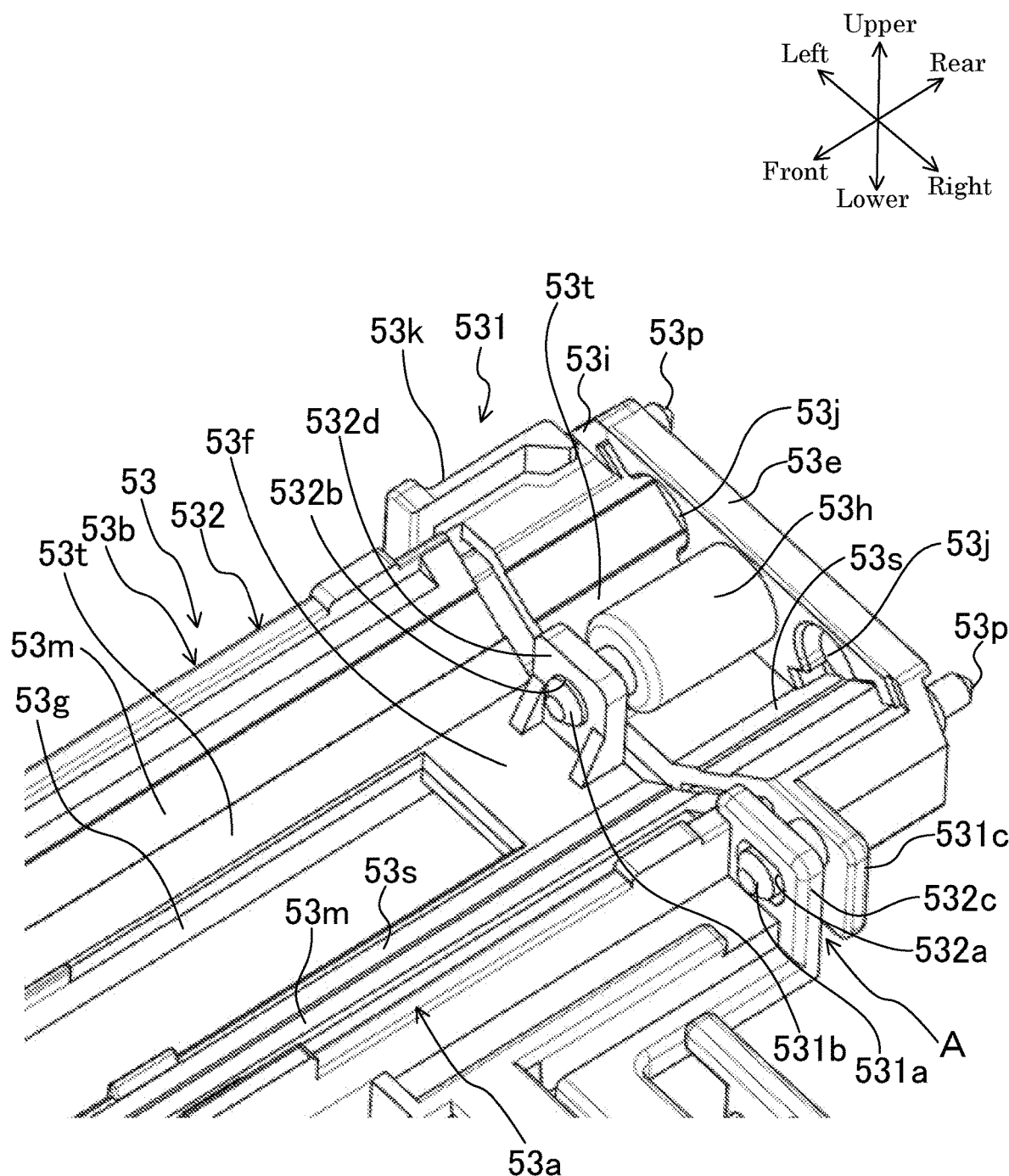
FIG. 14 is a perspective view for explaining a division structure of a support member that supports a light guide member.

As enlarged and illustrated in FIG. 13, the outer pressing member 82 has a V-shaped part 82a, a horizontal plate part 82b, a vertical plate part 82c, and an engaging claw 82d. The V-shaped part 82a is formed to be fitted into a connection part between the outer ends of the flat plate parts 71b and 72b and the light guide bodies 71a and 72a of the light guide members 71 and 72 (FIG. 13 illustrates only the light guide member 72). A base end of the V-shaped part 82a is supported by the horizontal plate part 82b in a cantilever shape, and the horizontal plate part 82b is slightly bent to urge the V-shaped part 82a downward. A base end of the horizontal plate part 82b is engaged with and fixed to the left side sheet metal 80d via the vertical plate part 82c and the engaging claw 82d. The left side sheet metal 80d is formed by cutting and raising a part of the sheet metal member 80. The engaging claw 82d protrudes from an inner side surface of the vertical plate part 82c and is engaged with an engaging hole 80f of the left side sheet metal 80d.

Details of Division Structure of Support Member

Next, the division structure of the support member 53 will be described with reference to FIG. 14 to FIG. 17. The support member 53 is divided into the one side divided part 531 and the other side divided part 532 at a position closer to the rear end in the front and rear direction. The one side divided part 531 constitutes the rear end part of the support member 53. A gap A is provided between the support surface 53s of the one side divided part 531 and the support surface 53t of the other side divided part 532. The gap A extends in a direction (a perpendicular direction in the present embodiment) crossing the longitudinal direction of the light guide members 71 and 72 when viewed from the sides of the light guide members 71 and 72. A dimension of the gap A is sufficiently larger than the amount of thermal expansion deformation of each of the divided parts 531 and 532 in the front and rear direction, which is caused by heat generation at the time of an image reading operation. That is, the gap A is set to a size enough for being able to absorb predicted thermal expansion deformation of each of the divided parts 531 and 532 in the front and rear direction.

From a right side end of the one side divided part 531, a rectangular bracket plate part 531c is formed to protrude. From the bracket plate part 531c, a first protruding pin 531a protrudes. The first protruding pin 531a has a cylindrical shape and protrudes frontward from a front side surface of the bracket plate part 531c. Furthermore, from a distal end surface (a front end surface) of the boss part 53h of the one side divided part 531, a second protruding pin 531b protrudes. The second protruding pin 531b has a cylindrical shape and protrudes frontward from the distal end surface of the boss part 53h.

At the right side end of a rear end part of the other side divided part 532, a first bracket plate part 532c is vertically installed. The first bracket plate part 532c is formed with a first engaging hole 532a long in the right and left direction. The first protruding pin 531a of the one side divided part 531 is engaged with the first engaging hole 532a. The first engaging hole 532a permits only displacement of the first protruding pin 531a in the right and left direction and the front and rear direction.

At the center of the rear end part of the other side divided part 532 in the right and left direction, a second bracket plate part 532d is vertically installed. The second bracket plate part 532d is formed with a second engaging hole 532b slidably fitted with the second protruding pin 531b of the one side divided part 531. The second engaging hole 532b permits only displacement of the second protruding pin 531b in the front and rear direction. The protruding pins 531a and 531b and the engaging holes 532a and 532b are respectively engaged with each other, so that the one side divided part 531 and the other side divided part 532 are expandably connected to each other in the front and rear direction.

Figure 15:
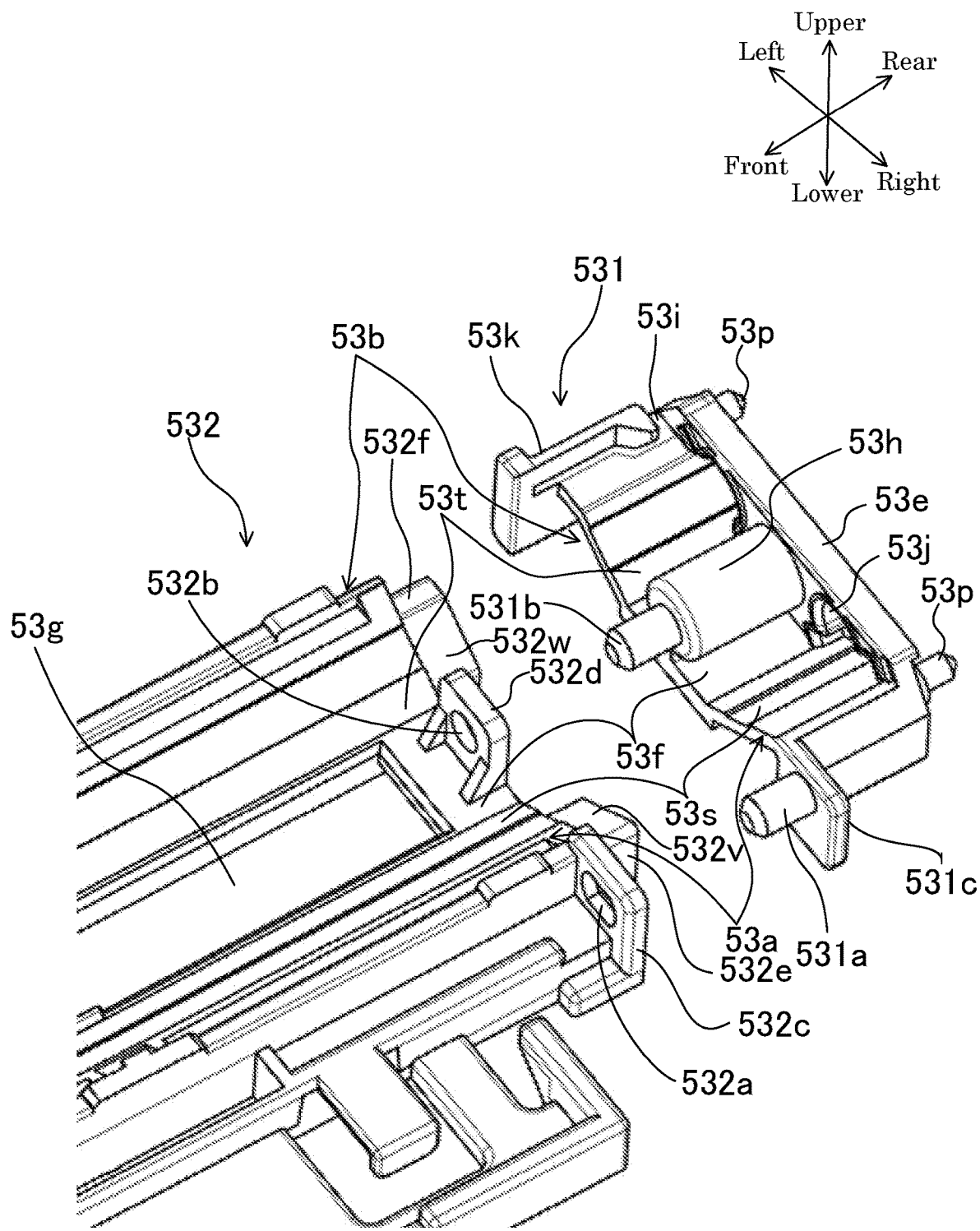
FIG. 15 is an exploded perspective view for explaining a division structure of a support member that supports a light guide member.
Figure 16:
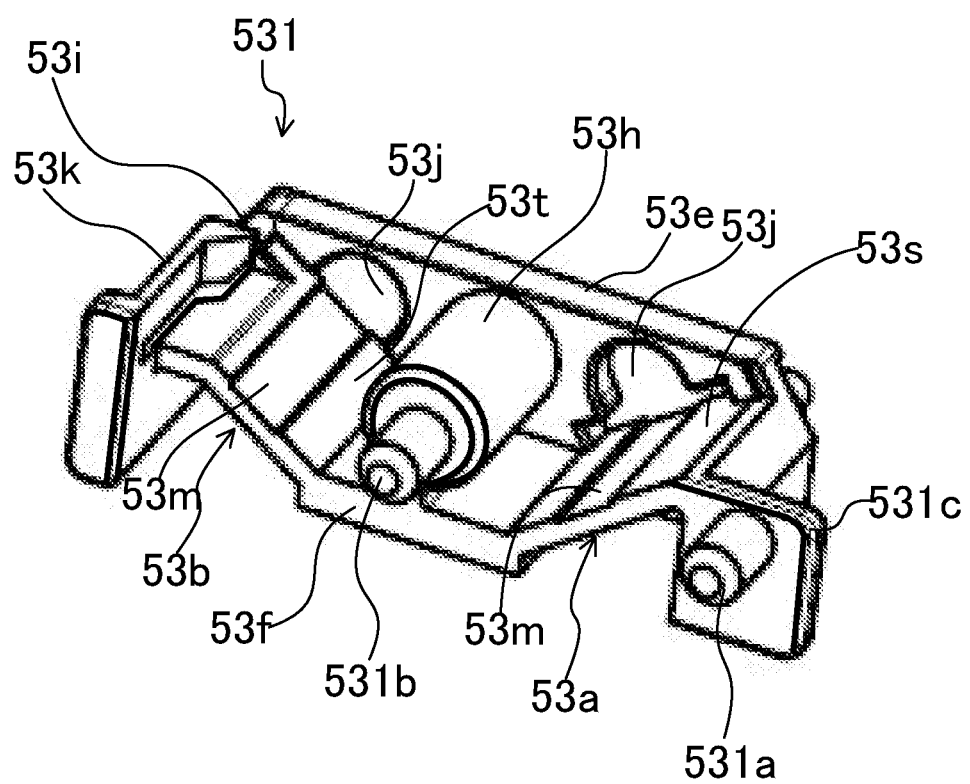
FIG. 16 is a perspective view illustrating a one side division part.
Figure 17:
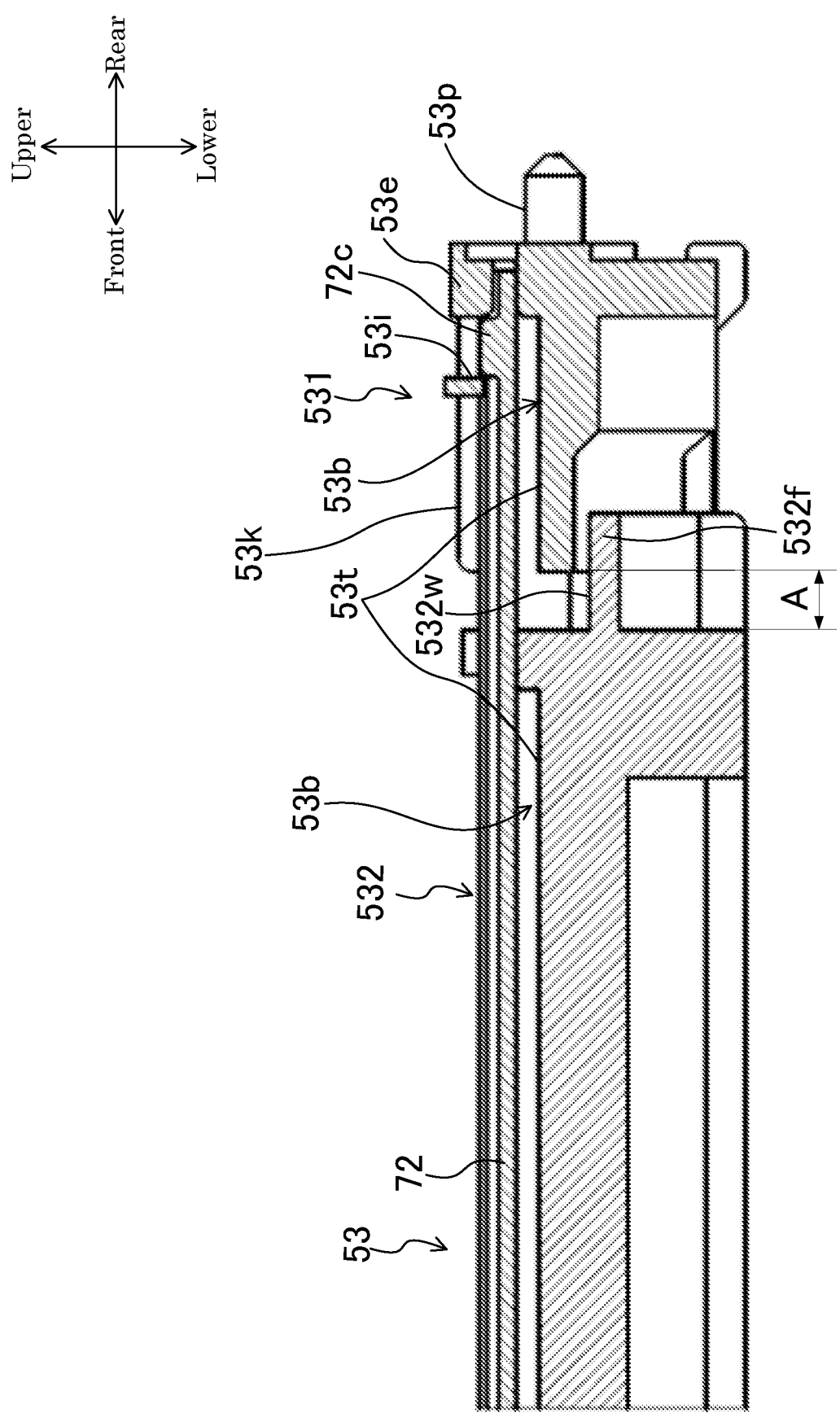
FIG. 17 is a longitudinal sectional view following a second light guide member at a rear end part of a support member.

As illustrated in FIG. 15 and FIG. 17, from a rear end surface of the other side divided part 532, a first overlapped part 532e and a second overlapped part 532f (FIG. 17 illustrates only the second overlapped part 532f) protrude. The overlapped parts 532e and 532f are formed to enter under the reflecting-side support parts 53a and 53b of the one side divided part 531. Upper surfaces of the overlapped parts 532e and 532f are inclined in parallel to the support surfaces 53s and 53t of the reflecting-side support parts 53a and 53b. A part of the upper surfaces 532v and 532w of the overlapped parts 532e and 532f is exposed to the sides of the light guide members 71 and 72 from the gap A (that is, is visible from the sides of the light guide members 71 and 72). The upper surfaces 532v and 532w of the overlapped parts 532e and 532f become reflecting surfaces capable of reflecting light toward the inside of the light guide members 71 and 72, similarly to the support surfaces 53s and 53t.

Operation and Effect

In the image reading device 3 configured as above, the light guide members 71 and 72 have the flat plate parts 71b and 72b extending in the longitudinal direction thereof and the light guide bodies 71a and 72a that protrude from one side surface in the thickness direction of the flat plate parts 71b and 72b, extend in the longitudinal direction, and have surfaces formed with the light emitting part So, and are molded such that their sectional shapes vertical to the longitudinal direction are hat shapes.

As described above, the light guide members 71 and 72 are formed to have a sectional hat shape, so that it is possible to prevent burr from occurring on the surfaces of the light guide members 71 and 72 that are molded products. That is, in the related molding method of the light guide member, a mold is divided into a plurality of (for example, four) molds in a circumferential direction when viewed from the longitudinal direction of the light guide member and each split mold is radially opened/closed in a radial direction. However, in the related molding method, abutting surfaces of adjacent split molds may be rubbed with each other at the time of opening/closing and abraded. Therefore, there is a problem that burr easily occurs in a molded product in a boundary position of the split molds.

Figure 18:
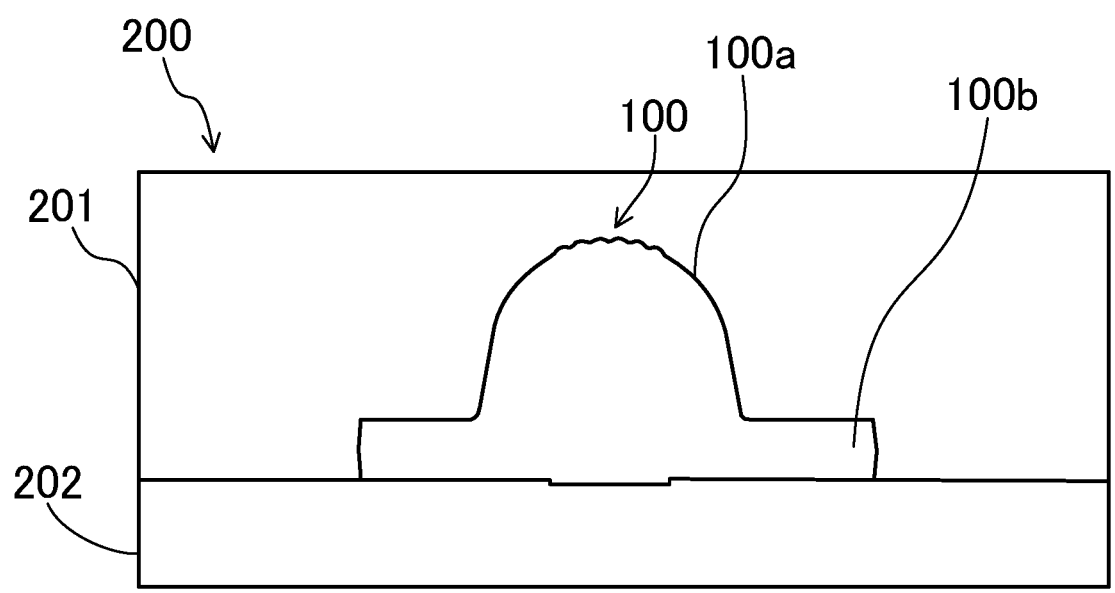
FIG. 18 is a schematic view illustrating a mold for molding used when a light guide member having a sectional hat shape is formed.

In contrast, in the present embodiment, since a light guide member 100 is formed to have a sectional hat shape including a light guide body 100a and a flat plate part 100b as illustrated in FIG. 18, a mold 200 for molding the light guide member 100 can be configured with a first mold 201 and a second mold 202 facing each other to be separated from and contacted with each other. Consequently, since there is no slidable contact in the mold 200 at the time of opening/closing as described above, it is possible to suppress the occurrence of the aforementioned burr.

When the sectional shape of the light guide member vertical to the longitudinal direction is a hat shape, both end parts of the light guide members 71 and 72 are easily warped up with respect to intermediate parts as described in FIG. 19.

In contrast, in the present embodiment, the support surfaces 53s and 53t of each of the light guide members 71 and 72 in the support member 53 (the one side and the other side divided parts 531 and 532) abut the lower surfaces (surfaces opposite to the sides of the light guide bodies) of the flat plate parts 71b and 72b of the light guide members 71 and 72.

Consequently, displacement of the intermediate parts in the longitudinal direction of the light guide members 71 and 72 to a lower side is regulated by the support surfaces 53s and 53t, so that it is possible to suppress deformation of both end parts of each of the light guide members 71 and 72 such as warping up.

Moreover, in the present embodiment, the support member 53 is placed on the upper surface of the sheet metal member 80 (the bottom side sheet metal 80a) fixed to the bottom wall part of the moving carriage 31. Furthermore, each of the light guide members 71 and 72 is pressed and fixed to each of the support surfaces 53s and 53t by the outer pressing members 82 engaged with and fixed to the left side sheet metal 80d of the sheet metal member 80 and the inner pressing members 81 engaged with and fixed to the bottom side sheet metal 80a of the sheet metal member 80.

According to this, displacement of each of the light guide members 71 and 72 to the light emitting part So side is regulated by the pressing members 81 and 82. Consequently, it is possible to more reliably suppress deformation of both end parts of each of the light guide members 71 and 72 such as warping up.

Moreover, each of the pressing members 81 and 82 is provided over the whole of each of the light guide members 71 and 72 in the longitudinal direction. Consequently, both end parts of each of the light guide members 71 and 72 are further suppressed from being warped up.

Furthermore, the support member 53 abuts and is placed on the upper surface of the bottom side sheet metal 80a of the fixed sheet metal member 80. According to this, the support member 53 is placed on the firm metallic sheet metal member 80, so that it is possible to improve support stiffness of each of the light guide members 71 and 72 by each of the support surfaces 53s and 53t of the support member 53. Consequently, pressing force of each of the pressing members 81 and 82 is securely received by each of the support surfaces 53s and 53t, so that each of the light guide members 71 and 72 can be corrected in a straight shape with no warping.

Furthermore, in the present embodiment, the support member 53 is divided into the one side divided part 531 and the other side divided part 532 in the front and rear direction (the longitudinal direction of the first and second light guide members 71 and 72). Furthermore, the gap A is provided between the support surfaces 53s and 53t of the one side divided part 531 and the support surfaces 53s and 53t of the other side divided part 532.

According to the configuration, even though the divided parts 531 and 532 are thermally expanded in the front and rear direction due to heat generation and the like of the light sources 61 and 62, the gap A between both divided parts 531 and 532 is reduced, so that it is possible to absorb the thermal expansion deformation. Consequently, it is possible to prevent warping of the light guide members 71 and 72 due to a linear expansion difference between the support member 53 and the light guide members 71 and 72. Thus, it is possible to reduce a variation in the amount of light, which is emitted from the light emitting part So of each of the light guide members 71 and 72, depending on a position in the front and rear direction.

Furthermore, the support member 53 is mounted and fixed to the fixed sheet metal member 80. Therefore, since thermal expansion deformation of the support member 53 in the front and rear direction is limited by the sheet metal member 80, the support member 53 is easily warped up. As a consequence, the light guide members 71 and 72 supported to the support member 53 may be warped.

In contrast, in the present embodiment, thermal expansion deformation of the support member 53 in the front and rear direction is absorbed by the gap A, so that it is possible to prevent warping of the support member 53 and thus to prevent warping of the light guide members 71 and 72.

Furthermore, in the present embodiment, the support surfaces 53s and 53t of the one side and the other side divided parts 531 and 532 become reflecting surfaces capable of reflecting light toward the inside of the light guide members 71 and 72, adjacent parts of the one side divided part 531 and the other side divided part 532 overlap each other via the overlapped parts 532e and 532f provided to the other side divided part 532, and the upper surfaces 532v and 532w (surfaces exposed to the sides of the light guide members 71 and 72 through the gap A) of the overlapped parts 532e and 532f become reflecting surfaces capable of reflecting light.

According to the configuration, it is possible to prevent reduction of the amount of light emitted from positions of the light guide members 71 and 72, which correspond to the gap A.

Furthermore, according to the present embodiment, the second protruding pin 531b protrudes from the one side divided part 531, the second engaging hole 532b is formed in the other side divided part 532, and the second protruding pin 531b is restricted to be movable in the second engaging hole 532b only in the front and rear direction (the longitudinal direction of the light guide members 71 and 72). In this way, the one side divided part 531 and the other side divided part 532 can be connected to each other with a simple structure so as to be displaceable in the front and rear direction.

Other Embodiments

In the aforementioned embodiment, an example, in which the support surfaces 53s and 53t of the support member 53 abut the lower surface of each of the light guide members 71 and 72, has been described; however, the technology of the present disclosure is not limited thereto and a gap may exist between each of the support surfaces 53s and 53t and each of the light guide members 71 and 72.

In the aforementioned embodiment, the overlapped parts 532e and 532f are formed at the other side divided part 532; however, the technology of the present disclosure is not limited thereto and the overlapped parts 532e and 532f may be formed at the one side divided part 531.

In the aforementioned embodiment, the inner and outer pressing members 81 and 82 are fixed to the sheet metal member 80; however, the technology of the present disclosure is not limited thereto and the inner and outer pressing members 81 and 82 may be fixed to the support member 53.

In the aforementioned embodiment, an example, in which the light guide bodies 71a and 72a have a semi-cylindrical shape, has been described; however, the technology of the present disclosure is not limited thereto and for example, the light guide bodies 71a and 72a may have a polygonal prismatic shape.

The technology of the present disclosure is available for an illumination device and an image reading device including the same, and particularly is available when it is applied to a copy machine, a printer, a multifunctional peripheral (MFP), a facsimile and the like.

What is claimed is:

1. An illumination device comprising:
   a light emitting unit;
   a light guide member formed in a rod shape, having one end part in a longitudinal direction facing the light emitting unit, and formed on a peripheral surface thereof with a light emitting part extending in the longitudinal direction; and
   a support member that covers an opposite side of a side of the light emitting part of the light guide member and supports both end parts in a longitudinal direction of the light guide member,
   wherein the light guide member has a flat plate part that extends in the longitudinal direction and a light guide body that protrudes from one side surface in a thickness direction of the flat plate part, is formed over an entire area in the longitudinal direction, and is provided on the peripheral surface thereof with the light emitting part, and is formed such that a sectional shape vertical to the longitudinal direction is a hat shape,
   the support member has a pair of end support parts that support both end parts in the longitudinal direction of the light guide member respectively and a flat plate part-support part that supports a surface of the flat plate part of the light guide member, which is opposite to a side of the light guide body,
   a support surface of the flat plate part-support part abuts the surface in an entire area in the longitudinal direction of the surface of the light guide member,
   the flat plate part-support part is divided in an intermediate position in the longitudinal direction of the light guide member, so that the support member is divided into a one side divided part and the other side divided part, and
   a gap is provided between the one side divided part and the other side divided part to extend in a direction crossing the longitudinal direction of the light guide member, and absorbs thermal expansion deformation in the longitudinal direction of the light guide member.

2. The illumination device of claim 1, further comprising:
   a pressing member that presses the light guide member to the support surface of the flat plate part-support part.

3. The illumination device of claim 2, wherein the support member abuts and is placed on an upper surface of a fixed sheet metal member.

4. The illumination device of claim 1, wherein the support surface of the flat plate part-support part becomes a reflecting surface that is able to reflect light toward the inside of the light guide member,
   one of the one side divided part and the other side divided part is provided with an overlapped part that enters under a side of a support surface of a flat plate part-support part of the other divided part, and
   a surface of the overlapped part, which is exposed to a side of the light guide member through the gap, becomes a reflecting surface that is able to reflect light toward the inside of the light guide member.

5. The illumination device of claim 1, wherein one of the one side divided part and the other side divided part is formed with a pin extending in the longitudinal direction, the other divided part is formed with an engaging hole engaged with the pin, and the pin is restricted to be movable in the engaging hole only in the longitudinal direction.

6. The illumination device of claim 1, wherein the support member is mounted and fixed to a fixed sheet metal member.

7. An image reading device comprising the illumination device of claim 1.

8. The illumination device of claim 1,
   wherein the flat plate part-support part of the support member extends along the longitudinal direction of the light guide member,
   the pair of end support parts are connected to the both end parts in the extension direction of the flat plate part-support part, and are formed in a plate shape vertical to the support surface of the flat plate part-support part,
   the pair of end support parts are formed with a fitting hole passing though in a thickness direction respectively, and
   the both end parts in the longitudinal direction of the light guide member are fitted in the fitting hole of the pair of end support parts so as to be supported to the pair of end support parts.

* * * * *